Aug. 21, 1928.
S. G. BENZING
1,681,387
EGG CANDLING DEVICE
Filed April 4, 1927     2 Sheets-Sheet 1
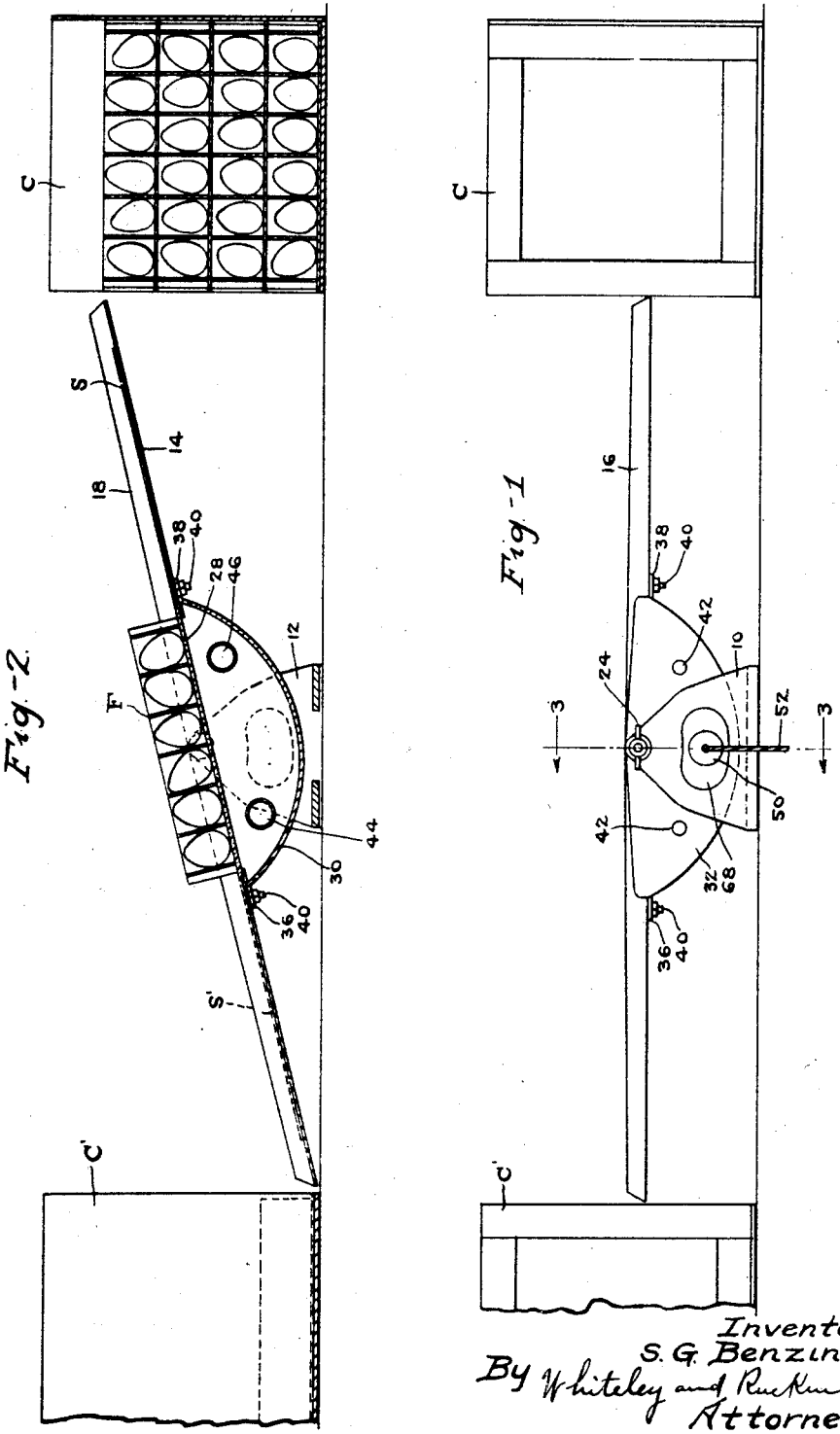
Inventor
S. G. Benzing.
By Whiteley and Ruckman
Attorneys

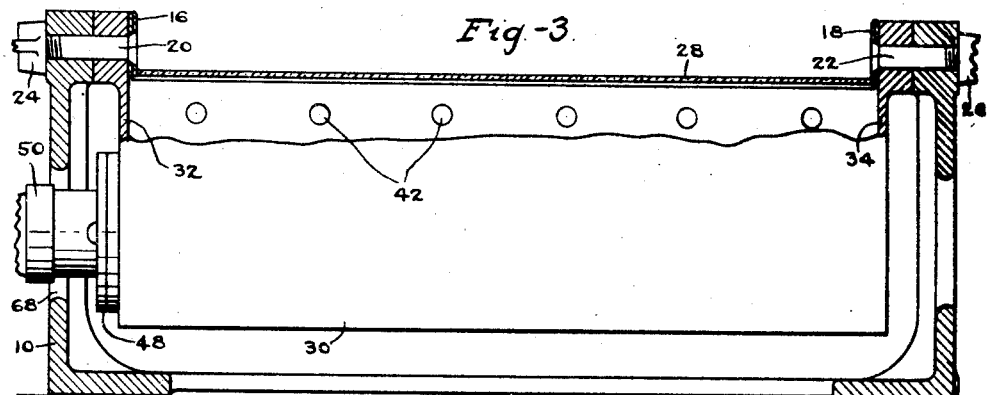
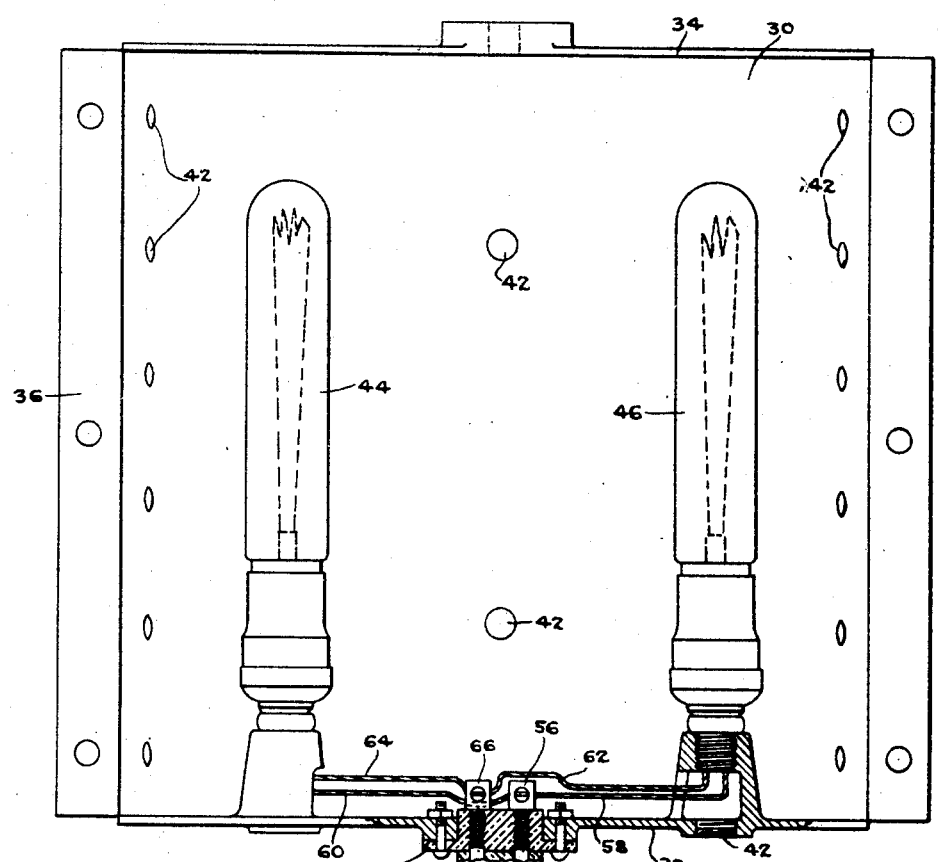

Patented Aug. 21, 1928.

1,681,387

UNITED STATES PATENT OFFICE.

SAMUEL G. BENZING, OF GRAND RAPIDS, MINNESOTA.

EGG-CANDLING DEVICE.

Application filed April 4, 1927. Serial No. 180,743.

My invention relates to egg candling devices. Among the objects of the invention are to provide a device which is effective to candle a large number of eggs at one time, and which is simple in construction and economical from a manufacturing standpoint. I accomplish the objects of my invention by providing a tilting slideway upon which customary egg fillers containing eggs are slid from filled egg cases into empty egg cases, the slideway being successively tilted into proper position to receive and deliver the fillers in the different layers in the egg case, and an entire filler being candled at one time during its passage along the slideway.

The full objects and advantages of my invention will appear in connection with the detailed description thereof, and the novel features of my inventive idea will be particularly pointed out in the claims.

In the accompanying drawings which illustrate one form in which my invention may be embodied,—

Fig. 1 is a side elevational view of the device. Fig. 2 is a view in longitudinal vertical section showing a filler of eggs in candling position. Fig. 3 is a view on an enlarged scale, taken on the line 3—3 of Fig. 1. Fig. 4 is a plan view of the lamp portion of the device with a small part shown in section.

As shown in the drawings, I provide a support consisting of two standards 10 and 12 which are spaced from each other to receive between them a slideway consisting of a bottom member 14 and two side members 16 and 18. The slideway is intermediately pivoted on the standards by bolts 20 and 22 on the ends of which are threaded wing nuts 24 and 26 by means of which the frictional resistance to tilting or turning the slideway may be regulated as desired. The middle portion of the bottom member 14 is provided with a rectangular opening of about the size of an egg filler and in which is set a transparent plate 28 which may be of yellow tinted glass. This transparent plate is set in the bottom member 14 so as to project slightly above the same for a purpose which will be referred to later. Positioned below the transparent plate, there is a lamp housing having a curved downwardly concaved bottom 30 and side members 32 and 34 which extend upwardly and are provided near their upper margins with perforated bosses 35 through which the bolts 20 and 22 pass. In the form shown in the drawings, the bottom member 30 has outwardly extending end flanges 36 and 38 which rest against the underside of the slideway and are secured thereto by bolts 40. The housing is provided with perforations 42 for ventilation. While the lamp housing may be provided with any suitable source of light, I prefer to employ two elongated electric bulbs 44 and 46 located at the two opposite sides of the center of rotation of the slideway. In order to maintain both of these bulbs at the same distance below the transparent plate regardless of the tilted position of the slideway, the bulbs are supported by the side member 32 as shown in Fig. 4 so that they move with the slideway when the latter is tilted. It is also desirable to provide the two bulbs with a single plug for convenience in using the device. The following construction is shown for obtaining the results above referred to. The side flange 32 is provided with an opening in which a socket member 48 is secured. For cooperation with this socket member, I provide a plug member 50 to which lead in and lead out wires 52 and 54 are attached in the usual manner. The current passes to the terminal 56 from which it passes into the two lamps through the wires 58 and 60 connected to this terminal. Current passes from the lamps through the wires 62 and 64 which are connected to the other terminal 66. The standard is provided with a slot 68 in which the plug member 50 swings when the slideway is tilted. The upper surface of the bottom member 30 of the housing may be nickleplated in order to make it more light-reflective.

The operation and advantages of my invention will now be obvious. Eggs are commonly packed in cases in layers, there being thirty-six eggs in each layer placed individually in fillers and with five layers in each case separated by sheets of cardboard. The fillers consist of cardboard partitions extending in such manner that each egg is separated from the adjacent ones. It has been customary in candling eggs to take off the top member of the case and remove the eggs a few at a time. In place of such procedure, I remove a side member of the case and slide the fillers out one at a time, all of the eggs in a filler being candled simultaneously. In the use of my device, it is placed between a full case C and an empty case C' as shown in Fig. 2. The slideway is tilted so that its upper end is on a level with the bottom of the top filler F and its lower end is on a level with the bottom of the empty case. The top filler together with the underlying cardboard separator S is then slid toward candling position which of course is over the source of light. When the separator strikes the projecting edge of the transparent plate 28, the separator is stopped and the filler with the eggs therein moves directly upon the transparent plate where all of the eggs in the filler may be inspected at a glance and any spoiled ones quickly detected. The cardboard separator is transferred to the other side of the slideway as indicated at S' and the candled filler is slid thereon and then together therewith into the bottom of the empty case C'. The slideway is tilted to receive the next filler from the case C and the operation above outlined is repeated until the bottom filler has been candled and slid into the top of the case C'.

I claim:

1. An egg candling device comprising a support, a tilting slideway intermediately pivoted upon said support, said slideway having an opening intermediate its ends, a transparent plate set in said opening, and a source of light adjacent said plate.

2. An egg candling device comprising a support, a tilting slideway intermediately pivoted upon said support, said slideway having an opening intermediate its ends, a transparent plate set in said opening with its margin projecting slightly above the bottom member of said slideway, and a source of light positioned underneath said plate.

3. An egg candling device comprising a support, a tilting slideway intermediately pivoted upon said support, said slideway having an opening intermediate its ends, a transparent plate set in said opening, a housing underneath said plate secured to said slideway, and a source of light in said housing.

4. An egg candling device comprising a support, a tilting slideway intermediately pivoted upon said support, said slideway having an opening intermediate its ends, a transparent plate set in said opening, a housing underneath said plate secured to said slideway, and electric light bulbs supported by said housing.

5. An egg candling device comprising two standards spaced from each other, a tilting slideway between said standards and intermediately pivoted to the upper ends thereof, said slideway having an opening at its middle portion, a transparent plate set in said opening, and a source of light underneath said plate.

6. An egg candling device comprising a support, a tilting slideway intermediately pivoted upon said support, said slideway having an opening intermediate its ends, a transparent plate set in said opening, and a downwardly concaved lamp-housing underneath said plate secured to said slideway for tilting movement therewith.

In testimony whereof I hereunto affix my signature.

SAMUEL G. BENZING.